United States Patent [19]

Maeno et al.

[11] Patent Number: 4,878,077
[45] Date of Patent: Oct. 31, 1989

[54] MOTOR DRIVE AND CONTROL APPARATUS FOR A CAMERA

[75] Inventors: Hitoshi Maeno, Hachioji; Azuma Miyazawa, Mitaka; Astushi Maruyama, Yokohama, all of Japan

[73] Assignee: Olympus Optical Company Ltd., Japan

[21] Appl. No.: 250,385

[22] Filed: Sep. 28, 1988

[30] Foreign Application Priority Data

Sep. 29, 1987 [JP] Japan .................. 62-244954
Feb. 9, 1988 [JP] Japan .................. 63-027903

[51] Int. Cl.$^4$ .............................. G03B 3/00
[52] U.S. Cl. ...................... 354/400; 354/173.1; 354/195.1; 318/685
[58] Field of Search ............. 354/400, 401, 402, 437, 354/439, 452, 484, 173.1, 173.11, 195.1, 149.1; 318/685

[56] References Cited

U.S. PATENT DOCUMENTS

| | | | |
|---|---|---|---|
| 3,813,592 | 5/1974 | Ryberg | 318/685 |
| 4,129,813 | 12/1978 | Hunts et al. | 318/685 |
| 4,238,143 | 12/1980 | Shenk | 354/401 |
| 4,254,371 | 3/1981 | Scholten | 318/685 |
| 4,336,987 | 6/1982 | Shenk | 354/401 |
| 4,354,748 | 10/1982 | Grimes et al. | 354/401 |
| 4,427,276 | 1/1984 | Feinerman et al. | 354/149.1 |

FOREIGN PATENT DOCUMENTS

0136772 8/1982 Japan .

Primary Examiner—Russell E. Adams
Attorney, Agent, or Firm—Louis Weinstein

[57] ABSTRACT

A motor drive and control apparatus for camera compares the speed of movement of a driven member, as detected by an encoder pulse, against a deceleration curve stored in a storage of CPU so as to turn the motor on and off or brake the motor in conformity to the deceleration curve. When the motor is on adjacent to a target position, the on condition of the motor is limited in synchronism with the encoder pulse.

23 Claims, 6 Drawing Sheets

MOTOR DRIVE AND CONTROL APPARATUS FOR A CAMERA

BACKGROUND OF THE INVENTION

The invention relates to a motor drive and control apparatus for a camera, and more particularly, to such apparatus which drives a driven member such as a taking lens or a photographic film used in an automatic focus adjusting unit or automatic film winding unit, respectively, through a given stroke toward a target position where it is stopped.

An automatic focus adjusting unit in which a taking lens is controlled to move to a target in-focus position has been proposed by the present applicant in Japanese Patent Application No. 302,692/1986, where a motor is controlled by comparing a deceleration curve against an actual speed of movement of a taking lens and in which a limited acceleration technique is employed as the taking lens approaches an in-focus position, by limiting an on time of the motor to a fixed time interval in order to prevent an overshooting which may result from the continued on condition of the motor. However, the limited acceleration takes place over a fixed time interval independently of the speed of movement of the taking lens which represents a driven member or the load, and hence it is inevitable that there occurs an over- or under-acceleration. In addition, the program used merely counts the length of time during which the motor is turned on, and hence it is impossible to sense a signal from a detector which detects a speed of movement, causing a likelihood that the speed of movement may be erroneously detected.

An automatic film winding unit in which a drive motor is stopped at a given winding step position is disclosed in Japanese Laid-Open Patent Application No. 24,123/1983. In this disclosure, a pulse which is developed in response to a movement of a film through a given stroke is utilized after the motor has entered a constant speed rotation to derive a speed of movement of a film which represents a driven member, and a brake is applied on the basis of an expected overrun which is derived from a previously stored table representing a relationship between the speed of movement of the film and the magnitude of overrun. However, because the application of the brake is based on the expected overrun, any variation in the load being wound up or drive voltage which might occur during the braking operation may cause a deviation between the expected and the actual overrun, resulting in a failure to stop the film winding operation at a target position. In addition, the relationship between the speed of movement of the film and the overrun may vary from product to product, involving the likelihood that a certain product may fail to stop the film at a target position.

SUMMARY OF THE INVENTION

In view of the foregoing, it is an object of the invention to provide a motor drive and control apparatus for a camera in which the on-time of a motor is changed in accordance with the speed of movement of a driven member so that the driven member may be stopped at a target position.

In accordance with the invention, an over- or under-acceleration is eliminated by a control applied adjacent to a target position, and the driven member can be accurately decelerated toward the target, thus improving the accuracy of the operation.

DETAILED DESCRIPTION OF PREFERRED EMBODIMENTS

Figure 1:
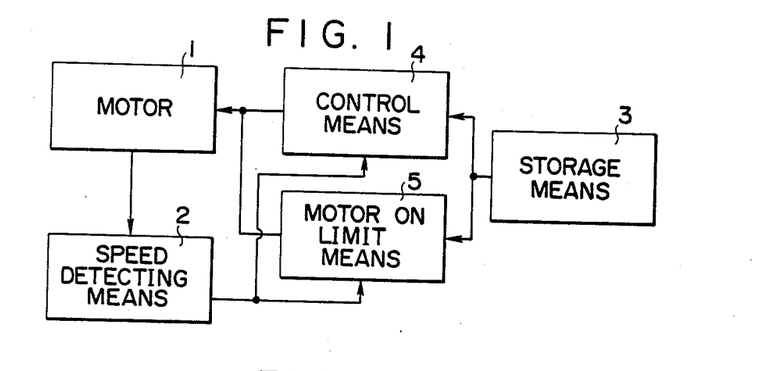
FIG. 1 is a block diagram illustrating the basic construction of a motor drive and control apparatus according to the invention.

The basic construction of a motor drive and control apparatus for a camera according to the invention is shown in block form in FIG. 1. Specifically, the speed of movement of a driven member which is driven by a motor 1 is detected by a speed detecting means 2, and the detected speed of movement is compared, by control means 4, against a deceleration curve stored in memory means 3 which is chosen as an optimum to stop the driven member at a target position. In this manner, the control means 4 drives and controls the motor 1 so that the driven member may be moved to an in-focus position in conformity with the deceleration curve. If the speed of movement of the driven member is greater than that indicated by the deceleration curve stored in the memory means 3, a brake is applied to the motor 1. Conversely, if the speed of movement of the driven member is less, the motor 1 is turned on and off depending on the difference therebetween so as to control the speed in accordance with the deceleration curve. In the proximity of a target position, to prevent an over-acceleration which might result from a continued energization of the motor 1 and to derive an optimum acceleration at such point in time, a signal from the detecting means 2 operates the motor on limit means 5, thus forcibly turning the motor 1 off or braking it.

A motor drive and control apparatus according to one embodiment of the invention as applied to an automatic focus adjusting unit will now be described. In this instance, the motor 1 is utilized to move a taking lens to an in-focus position in accordance with an output from focus detecting means, and the speed of movement of the lens which is driven by the motor 1 is detected by the speed detecting means 2. The detected speed is compared against the stored deceleration curve within the control means 4, whereby the taking lens is controlled to move to the in-focus condition in conformity to the deceleration curve. In the proximity of the in-focus position, the motor on limit means 5 limits the on condition of the motor 1 until it stops.

Figure 2:
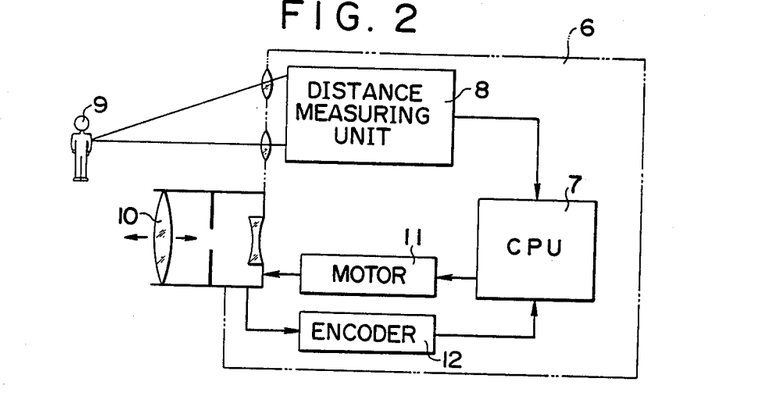
FIG. 2 is a schematic view of one embodiment of the invention as applied to an automatic focus adjusting unit.

FIG. 2 shows one embodiment of the invention applied to an automatic focus adjusting unit. A camera body 6 includes CPU (central processing unit) 7 which receives information representing a distance to an object 9 being photographed, which is determined by a distance measuring unit 8 operating on the basis of trigonometry. In response thereto, CPU 7 determines a travel of a taking lens 10 on the basis of such distance information, and turns on a lens driving motor 11 to begin moving the taking lens 10. The speed of movement and the travel of the taking lens 10 are fed back to CPU 7 by an encoder 12 which comprises a photo-interrupter or the like.

Figure 3:
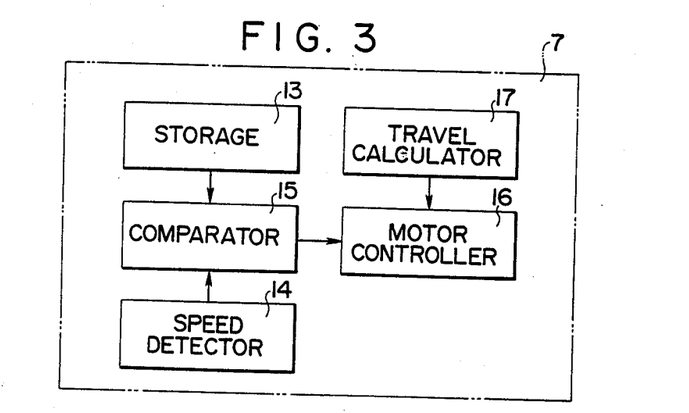
FIG. 3 is a block diagram of CPU shown in FIG. 2.

As shown in FIG. 3, CPU 7 includes a comparator 15 which compares the speed of movement of the taking lens 10 which is detected by a speed detector 14 in response to an input from the encoder 12 against a deceleration curve stored in a storage 13, and an output from the comparator is fed to a motor controller 16. Information from the distance measuring unit 8 which represents a distance is supplied to a travel calculator 17 which translates it into a travel of the taking lens 10. The travel is fed to the motor controller 16, which then responds to the travel and the output from the comparator 15 to control a turn-on or turn-off of the motor 11 or the application of a brake. In this manner, the taking lens 10 is controlled to be decelerated toward an in-focus target position generally conforming to the stored deceleration curve so that it may be accurately stopped at the target position. It is to be understood that these functions are achieved internally within CPU 7 by utilizing a program.

The operation of CPU 7 to control the movement of the lens will now be described in more detail with reference to a flow chart shown in FIG. 4. When a program starts in response to an operation of a release switch or the like, a distance is determined by the distance measuring unit 8 at step #1. Information representing the distance determined is transmitted to CPU 7, whereupon a target position of the taking lens 10 is calculated at step #2. Subsequently the motor 11 is energized to begin feeding the taking lens 10 forward at step #3. At step #4, it is examined if the current position of the taking lens 10 has entered a control zone from the target position, and the operations of steps #4 and #21 are repeated to continue the energization of the motor 11 until the control zone is entered. In the event an abnormal condition is detected such as a failure of entering the control zone after a given time interval has passed or the absence of a signal from a photo-interrupter due to a failure of such photo-interrupter, the motor 11 or other mechanical parts, the program transfers to step #20 where an abnormality processing is performed.

If the control zone is entered, the travel of the taking lens 10 is initially derived by counting the pulse from the photo-interrupter, and is then compared against the target position to see if he current position is one pulse short of the target position at step #5. If it is found that the current position is one pulse short of the target position, the brake is applied at step #22, and the control operation is terminated at step #23. Normally, the current position cannot be one pulse short of the target position immediately after the control zone is entered. Accordingly, at next step #6, the current speed of movement of the taking lens 10 is compared against a first deceleration curve which is stored in the storage means 13. The speed of movement of the taking lens 10 is detected by determining an interval between pulses from the photo-interrupter. If the speed of movement is greater than that indicated by the deceleration curve, the brake is applied for purpose of deceleration at step #12. If the speed of movement is less than that of the deceleration curve, a second deceleration curve is derived by subtracting a given value x from a corresponding value of the first deceleration curve, and the speed of movement is compared against the second curve. If it is found that the speed of movement is greater than that indicated by the second deceleration curve, the motor is turned off to idle to allow a coasting of the taking lens 10 by inertia at step #8. If the speed of movement is found to be less than that indicated by the second deceleration curve, it is then examined at step #9 whether the current position is within three pulses from the target position (although such determination is not limited to three pulses). If the current position is within three pulses from the target position, a flag indicating that a limited acceleration is currently employed is set and the motor 11 is turned on at step #11. Otherwise, the motor 11 is turned on simply at step #10.

After controlling the turn-on and -off of the motor 11 and the application of the brake in the manner mentioned above, the rising edge of the pulse from the photo-interrupter is detected in order to detect the speed of movement of the taking lens 10 at step #13. Specifically, a time interval from the rising edge of a preceding pulse to the rising edge of a current pulse is calculated, and utilized as indicating the speed of movement of the taking lens 10. In the absence of a pulse from the photo-interrupter, a time interval during which no rising edge appears is counted to see if a given time interval has passed at step #17. When the given time interval passes, it is then concluded that the taking lens has come to a stop for some reason before it reaches the target position. Accordingly, the motor 11 is forcibly turned on to wait for the rising edge of the pulse at step #18. This given time interval is called a " stop limiter". The stop limiter enhances the resistance of the program to an increased load condition, and is effective when the speed of movement of the taking lens 10 exceeds a programmed limit imposed for the detection of the speed to cause the brake to be applied erroneously before the target position is reached as a result of a reduction in the voltage across the motor or an increase in the load which the taking lens 10 experiences during its movement. After the stop limiter becomes on, it is determined if there occurs a rising edge of the pulse from the photo-interrupter during another given time interval at step #19. If there is no rising edge of the pulse during such time interval, it is determined that an abnormal condition has occurred, whereupon the motor 11 is turned off to perform an abnormality processing at step #20.

In response to the rising edge of the pulse from the photo-interrupter, the speed is detected at step #14, and it is then examined at step #15 whether a limited acceleration is being employed or whether it is during the duration of the stop limiter. If either occurrence is the case, the motor 11 is turned off or the motor 11 is braked at step #16. Otherwise, the program returns to step #5 again where it is examined if the current position is one pulse short of the target position. If the current position is one pulse short of the target position, the brake is applied at step #22, and the focussing operation is terminated at step #23. As long as the current position reaches one pulse short of the target position, the described operation is repeated, whereby the taking lens 10 is decelerated toward the target position generally conforming to the deceleration curve.

Figure 5:
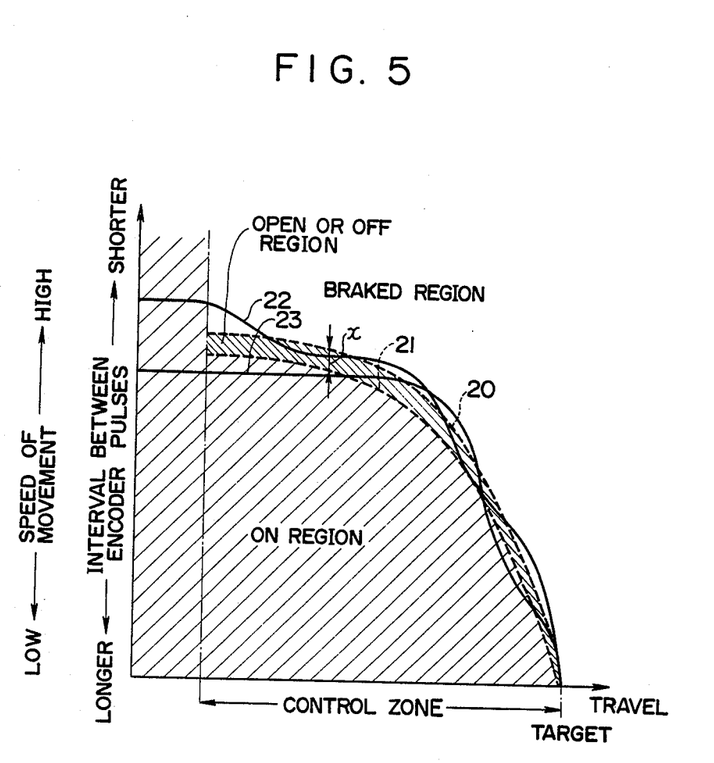
FIG. 5 is a diagram representing a decelerating process of a taking lens in terms of a travel and a speed of movement.

FIG. 5 shows the process of decelerating the taking lens 10 in terms of its travel and speed of movement. In FIG. 5, the abscissa represents the travel and the ordinate the speed of movement of the taking lens 10. The first deceleration curve is indicated by broken lines 20, and the second deceleration curve which is derived by subtraction of a given value x from the first deceleration curve is indicated by broken lines 21. In this Figure, a region which is hatched by lines extending upward to the right represents an ON region where the motor 11 is turned on while a region which is hatched by lines which extend downwardly to the right and which adjoins with the ON region at the broken lines 21 represents an open region where the motor 11 is turned off. A blank region which adjoins with the open region at the deceleration curve 20 represents a braked region.

A control operation over the motor 11 will be described with reference to an exemplary move curve 22. When the taking lens 10 is driven to enter the control zone, the prevailing speed is greater than that indicated by the first deceleration curve 20, and accordingly, the brake is immediately applied for reducing the speed of movement. When the speed of movement enters the open region located below the deceleration curve 20, the motor 11 is turned off. On the other hand, if the speed of movement goes above the deceleration curve 20, the braked region is entered where the motor 11 is braked to retard its speed, thus causing the speed of movement to decline below the deceleration curve 20 to enter the open region again. Thereupon, the motor 11 is turned off again. In this manner, the deceleration takes place so that the speed of movement conforms to the deceleration curve 20 until the resulting position is one pulse short of the target position, whereupon the brake is applied to stop the taking lens at the target position Considering then a move curve 23 which has a lower initial speed, the motor 11 continues to be turned on upon entering the control zone until the speed of movement goes above the second deceleration curve 21 to enter the open region where the motor 11 is turned off. As the speed of movement goes above the first deceleration curve 20 to enter the braked region, the brake is applied. As a result of a deceleration by the application of the brake, the lens enters the open region where the motor 11 is turned off. When the consequent speed of movement goes below the second deceleration curve 21 to enter the ON region, the brake is applied at a position which is one pulse short of the target position, thus stopping it.

Figure 6:
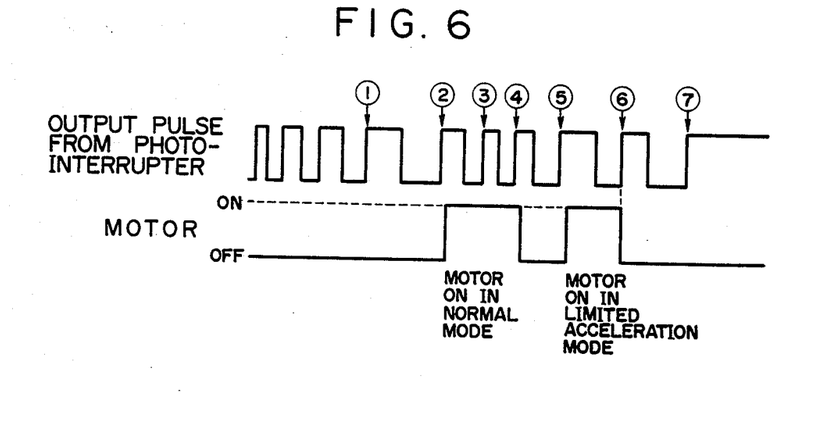
FIGS. 6 and 7 are timing charts illustrating an output waveform from a photo-interrupter and a motor on- and off-control in a limited acceleration and a stop limiter mode.
Figure 7:
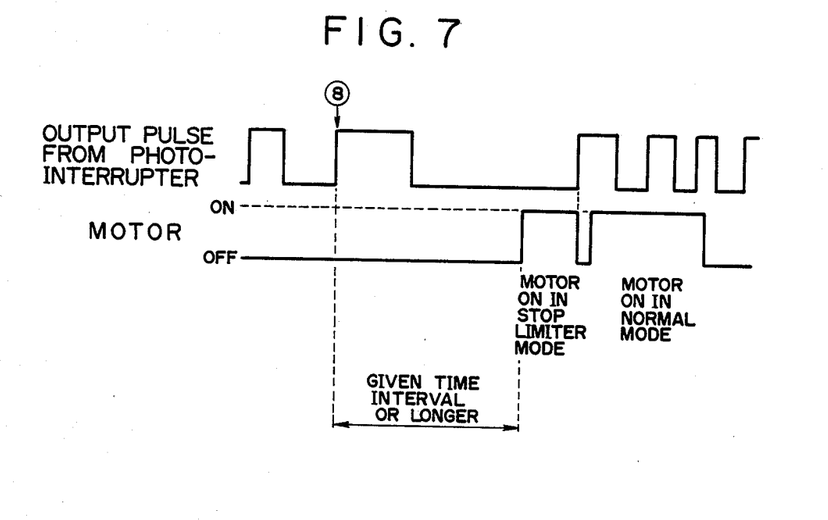

The operation according to the limited acceleration and the stop limiter illustrated above in the flow chart will now be described in detail with reference to FIGS. 6 and 7, which show the waveform of an output pulse from the photo-interrupter and an on/off condition of the motor 11, respectively. It will be noted that a pulse width in the waveform of the output pulse from the photo-interrupter is determined by the speed detector 14 within CPU 7 in the manner mentioned above. The shorter the pulse width, the greater the speed of movement of the taking lens 10. Conversely, the longer the pulse width, the less the speed of movement. As mentioned above, when the motor 11 is turned on and the taking lens 10 enters the control zone, the turn-on and -off of the motor 11 and the application of brake are controlled.

Assuming that the speed of movement at position ① corresponding to the rising edge of the pulse from the photo-interrupter (see FIG. 6) is greater than a corresponding value on the second deceleration curve 21 which is by a given value x less than that of the first deceleration curve 20, this means that the motor operation is in the braked region or open region of FIG. 5. If the speed of movement is less than the second deceleration curve 21 when the speed is detected at position ② corresponding to the rising edge of the next pulse from the photo-interrupter, the motor 11 is turned on. If the speed of movement does not exceed the deceleration curve 21 at position ③ corresponding to the rising edge of the next following pulse, the motor 11 continues to be turned on. When the speed detected goes above the deceleration curve 21 at position ④ corresponding to the rising edge of the fourth pulse, the motor 11 enters the open region where the acceleration is interrupted. It will be noted that position ④ is three pulses short of a target position ⑦, but the speed control predominates, and an examination to see if the current position is three pulses short of the target position is not made when the speed is above the deceleration curve 21. When the speed detected at position ⑤ corresponding to the rising edge of the fifth pulse goes below the second deceleration curve 21, the motor 11 is turned on in accordance with the limited acceleration since the current position is within three pulses short of the target position ⑦. If a flag representing the application of the limited acceleration is set, the motor 11 is immediately turned off or braked after the speed detection at position ⑥ corresponding to the rising edge of the sixth pulse. In this manner, an overshooting beyond the target position which might result from an excessive acceleration immediately before the position where the taking lens 10 is to be stopped is prevented. If the current position is one pulse short of the target position, the brake is immediately applied, allowing the taking lens 10 to be stopped at the target position ⑦.

When no pulse follows after the last position ⑧ corresponding to the rising edge of the eighth pulse shown in FIG. 7 for a time interval which exceeds a given value, indicating that the speed of movement of the taking lens has gone below a programmed limit for speed measurement due to an overload or a reduced voltage condition when the operation is in the control zone and has erroneously resulted in stopping the lens movement, the motor 11 is forcibly turned on and is maintained on until there occurs a rising edge of a pulse. If the absence of the rising edge of a pulse continues for a further time interval, it is concluded that there has happened an abnormal condition, thus turning the motor 11 off to perform an abnormality processing. However, if there is a rising edge of a pulse, the motor 11 is either turned off or braked, and the speed of movement of the taking lens is again detected to control the operation of the motor 11 so as to be decelerated toward the target position in conformity to the deceleration curve. This represents the operation in the stop limiter mode, enhancing the resistance to an overload. However, it is to be noted that the stop limiter is for emergency only, and preferably should not be activated.

In the examples described above in connection with FIGS. 6 and 7, it will be noted that the motor 11 is turned on and off at a small time interval after the rising edge of the pulse. Such time interval is required for CPU 7 to render a decision upon the motor control. It will also be noted that the motor 11 is turned off in substantial alignment with the rising edge of the pulse during the limited acceleration and the stop limiter mode.

In the embodiment described above, when the taking lens has moved close to the target position and the motor is on, the duration of on time of the motor can be regulated in accordance with the prevailing speed of movement of the lens. This simplifies the program, which can be executed more rapidly than when a software timer is utilized to provide a fixed on time of the motor. In addition, a failure to read a signal from the encoder avoided and a reliable detection of the speed is enabled, thus enabling a more positive decision to be rendered over the motor operation. In this manner, when the invention is applied to an automatic focus adjusting unit, an over and under-acceleration of the taking lens at a position close to the in-focus target position is eliminated, enabling the motor to be stopped exactly at the in-focus position.

A motor drive and control apparatus according to another embodiment of the invention as applied to an automatic film winding unit will now be described. In this instance, the motor 1 shown in FIG. 1 represents a motor which drives a film, now functioning as a driven member, to a target winding position in response to a photographing complete signal or the like. The speed of movement of the film which is driven by the motor 1 is detected by speed detecting means 2. The detected speed of movement of the film is compared against a stored deceleration curve in control means 4, whereby the film is controlled to move to a target winding position in conformity to the deceleration curve. When the target position is approached, motor on limit means 5 operates to limit the on condition of the motor 1 until it stops.

Figure 8:
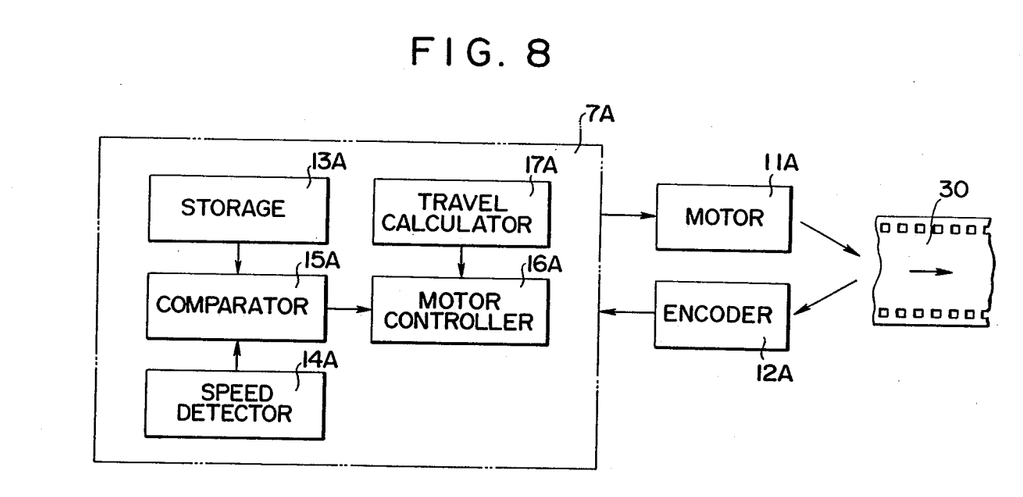
FIG. 8 is a block diagram of CPU used in another embodiment of the invention as applied to an automatic film winding unit.

In an automatic film winding unit a CPU which is provided within a camera body comprises CPU 7A shown in FIG. 8 which is similarly constructed and functions as CPU 7 shown in FIG. 3. A winding motor 11A winds up a film 30, the travel of which is counted and converted into an electrical signal by an encoder 12A, which may include a photo-interrupter so as to count the angle of rotation of a sprocket wheel, not shown, or the number of perforations formed in the film. The output from the encoder 12A is delivered to CPU 7A, which internally includes a speed detector 14A and a travel calculator 17A. The speed detector 14A determines an interval between successive output pulses from the encoder 12A to determine the speed of movement of the film. The travel calculator 17A counts the number of output pulses from the beginning of the winding operation, thus determining the travel of the film 30. A comparator 15A compares the output from the speed detector 14A against a deceleration curve which is previously stored in a storage 13A, and the result of comparison is delivered to a motor controller 16A, which is then effective to feed an on, an off or brake control signal to the motor 11A in accordance with the outputs from the comparator 15A and the travel calculator 17A so as to drive the motor 11A in conformity to the deceleration curve in order to stop it at the target position.

A film winding control operation by CPU 7A will now be described in detail with reference to a flow chart shown in FIG. 9. Upon termination of a film exposure, the program branches from a main flow, not shown, to a winding flow shown in FIG. 9. In this flow, the motor 11A is initially energized to initiate a film winding operation at step #31. At next step #32, it is examined if the film has reached a control zone associated with a target stop position as a result of its movement. This determination is made on the basis of a difference between the number of pulses from a photo-interrupter which is included within the encoder 12A and the number of pulses counted between the initiation of the winding operation until the target stop position is reached. If it is determined that the current position is outside the control zone as a result of such determination, the occurrence of a film end is examined at step #49. In the event of a film end, no pulse will be produced by the encoder 12A for a given time interval, which may be on the order of two to three seconds, for example, even though the motor 11A has been energized. In the event of such occurrence, it is determined that a film end is reached, and the program transfers to a rewind sequence at step #50. However, if the film end is not reached as determined at step #49, the steps #32 and #49 are repeated until the control zone is reached, thus continuing the on condition of the motor 11 until the control zone is entered.

If it is determined at step #32 that the control zone is entered, the program proceeds to step #33 where initial pulse from the encoder 12A is counted to determine if the target stop position is reached. If the target position is reached, the motor 11A is short-circuited at step #51 to apply a braking action to it, thus terminating the control operation at step #52. If the target stop position is not reached as a result of the determination at step #33, the current speed of movement of the films is compared against a speed derived from a first deceleration curve which is stored in the If the comparison reveals that the speed of movement of the film is greater, the motor 11A is braked at step #40. Conversely, if the speed of movement of the film is lower, the speed of movement is compared against a speed derived from a second deceleration curve at step #35. The second deceleration curve is derived by subtracting a given value y from the first deceleration curve stored in the storage 13A. If this comparison reveals that the speed of movement of the film is greater, the motor 11A ceases to be energized to allow a film winding operation to be effected by enertia of the motor 11A at step #36 since the speed is in a motor idling or open region. On the other hand, if the speed of movement of the film is below the second deceleration curve, it is examined if the current position is within three pulses short of the target stop position at step #37, and if it is not, the motor 11A is turned on at step #38. If the current position is within three pulses, a flag indicating an on condition of the limited acceleration mode is set at step #39 and the motor 11A is turned on.

The control of turning on and off and braking the motor 11A is completed by the described steps #36, #38, #39 and #40. The rising edge of a pulse signal from the photo-interrupter of the encoder 12A is then detected at step #41. In the absence of the rising edge of the pulse, it is examined at step #45 if a film end has been reached, in the similar manner as it occurs at step #49, and if the film end is not reached, the program transfers to a film rewind sequence at step #48. If the film end is not reached, it is detected at step #46 if a given time interval on the order of several hundreds of milliseconds has passed from the detection of the film end. If the time interval is found to have passed, it is concluded that the motor has stopped by a cause other than the film end, and accordingly the motor 11A is forcibly turned on and the stop limiter flag is set at step #47. The stop limiter mode is effective to prevent a decision from being rendered as a result of the speed of movement exceeding a programmed limit for the speed detection due to a reduction in the drive voltage of the motor 11A or an increased load during the movement of the film. If the time interval has not passed, the program is returned to step #41.

In the presence of the rising edge of a pulse from the encoder 12A, the speed of movement of the film is detected by counting a time interval from the rising edge
of the previous pulse to the rising edge of the current pulse at step #42. The program then proceeds to step #43 where it is examined if the limited acceleration flag has been set at step #39 or if the stop limiter flag has been set at step #47. If neither flag is set, the program returns to step #33. However, if either flag is set, the energization of the motor 11A ceases at step #44 or the brake is applied, whereupon the program returns to step #33. In this manner, the motor 11A is controlled so as to operate in conformity to a pre-stored deceleration curve so as to be exactly stopped at the target stop position.

As described, when the invention is applied to an automatic film winding unit, an over- or under-acceleration at a position close to the target stop position is eliminated during the film winding operation, thus allowing the motor to be stopped at an accurate position irrespective of any fluctuation in the drive voltage or winding torque of the motor and without any variation from product to product.

Figure 4:
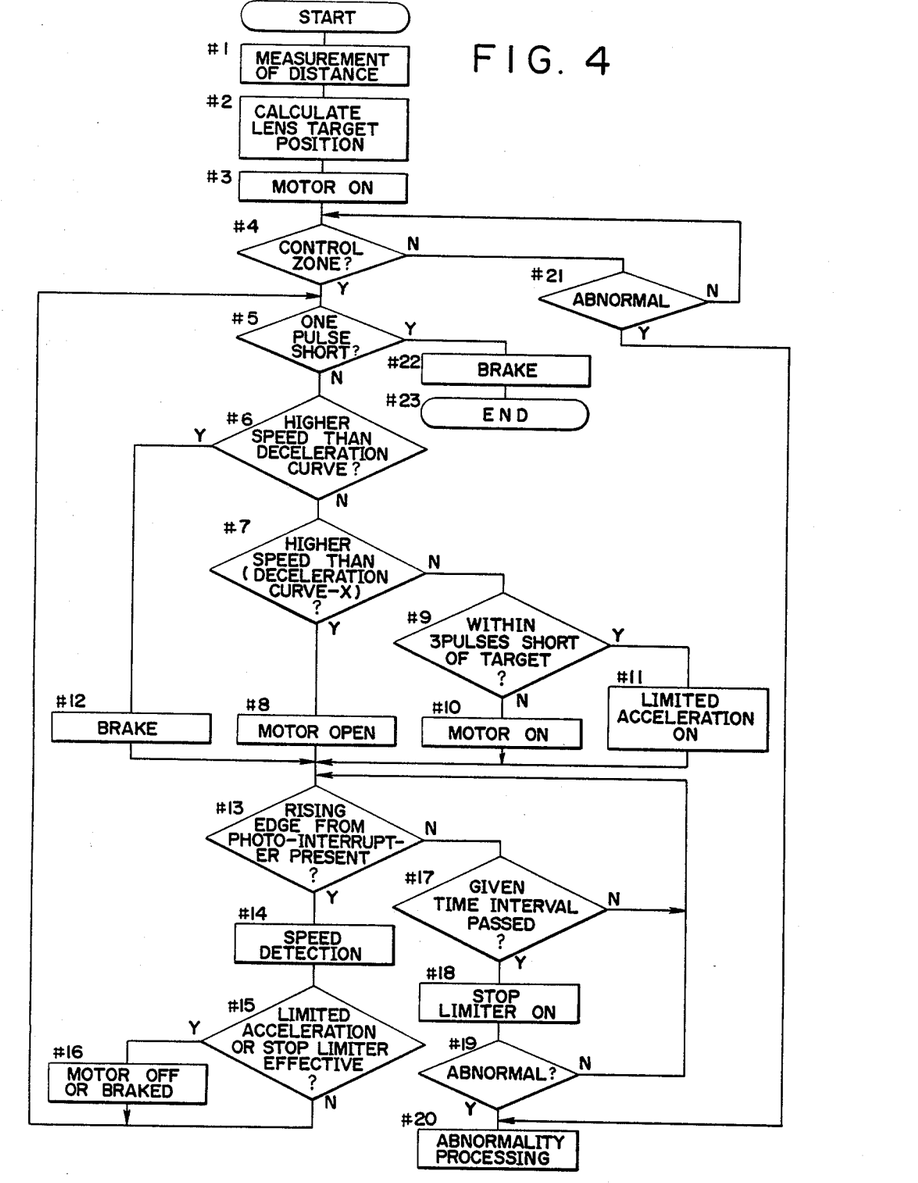
FIG. 4 is a flow chart illustrating a control over the motor drive by CPU shown in FIG. 3.
Figure 9:
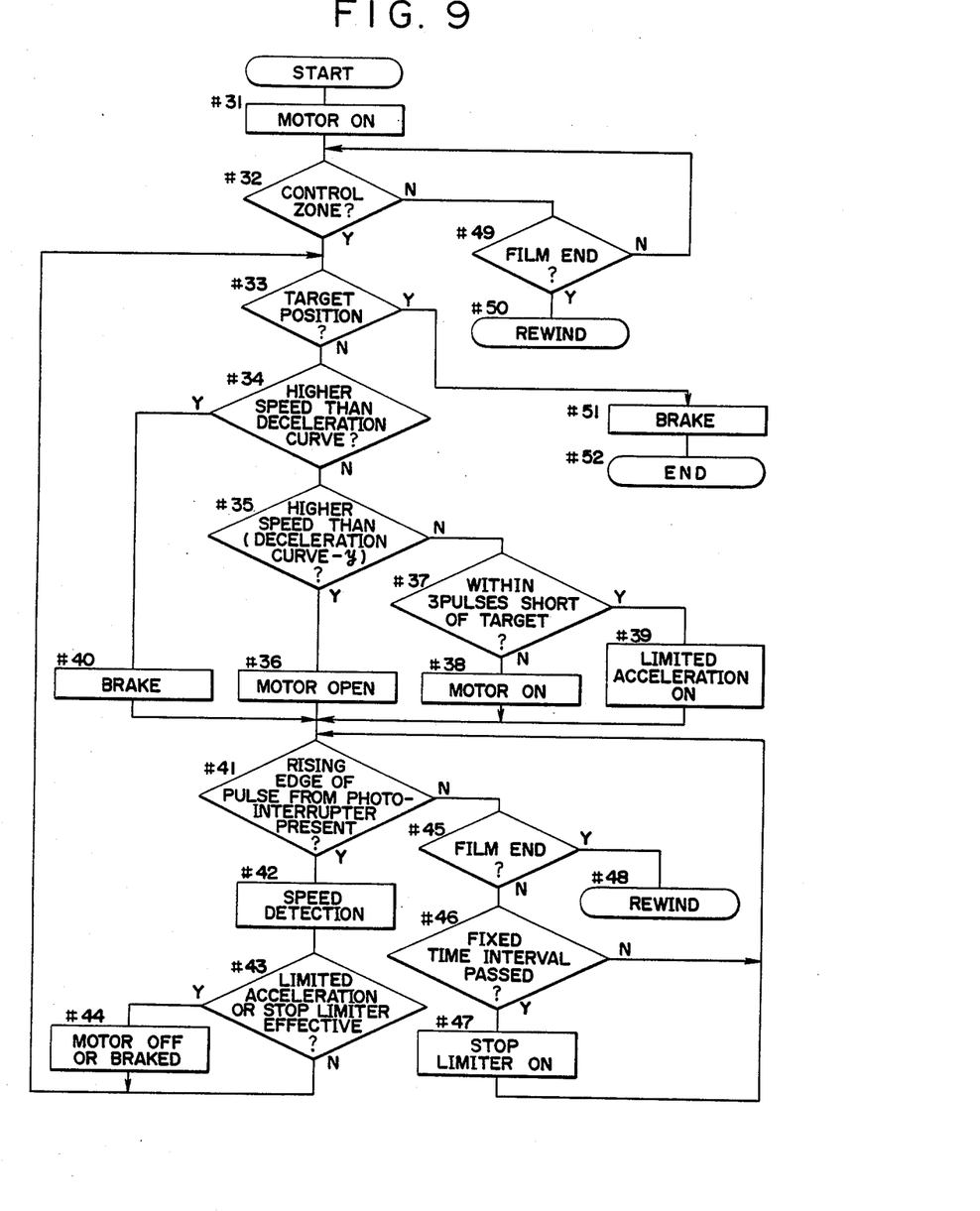
FIG. 9 is a flow chart showing a control over the motor drive by a CPU shown in FIG. 8.

In the flow charts shown in FIGS. 4 and 9 of the respective embodiments, the encoder signal is derived by reading the rising edge of a pulse from the photo-interrupter, but the falling edge of the pulse may be read as well. In addition, while the encoder 12 or 12A utilizes a photo-interrupter, it is not limited thereto, but any other detecting means such as a mechanical switch or Hall element may also be used.

Additionally, in the described embodiments, the second deceleration curve is derived by subtracting a given value x or y from the first deceleration curve, but instead of the subtraction, an arithmetic operation such as multiplication may also be utilized. In addition, the second deceleration curve itself may be stored.

What is claimed is:

1. A motor drive and control apparatus for a camera comprising
   a motor for driving a driven member;
   speed detecting means for detecting the speed of movement which is achieved by the motor;
   storage means for storing a deceleration curve which is used to stop the driven member at a target position;
   control means for comparing the speed of movement against the deceleration curve so as to control the driven member until the target position is reached in conformity with the deceleration curve;
   and motor on limit means effective close to the target position in a zone adjacent to the deceleration curve to limit the on condition of the motor by being activated by a signal from the speed detecting means while the motor is on.

2. A motor drive and control apparatus according to claim 1 in which the speed detecting means detects the speed of movement of the driven member by determining a pulse width of an output pulse from an encoder such as a photo-interrupter.

3. A motor drive and control apparatus according to claim 1 in which the speed detecting means detects the speed of movement of the driven member by determining a time interval from the rising edge of a previous pulse from an encoder such as a photo-interrupter to the rising edge of a current pulse therefrom.

4. A motor drive and control apparatus according to claim 1 in which the storage means stores a first deceleration curve and a second deceleration curve which is retarded by a given value from the first deceleration curve, the control means being effective to brake the motor whenever the speed of movement of the driven member is above the first deceleration curve, to turn the motor off when the speed of movement of the film is below the first deceleration curve, but is above the second deceleration curve, and to turn the motor on when the speed of movement is below the second deceleration curve.

5. A motor drive and control apparatus according to claim 1 in which the storage means stores a first deceleration curve and is operative to calculate a second deceleration curve which is retarded by a given value from the first deceleration curve, the control means being effective to brake the motor when the speed of movement of the driven member is above the first deceleration curve, to turn the motor off when the speed of movement of the driven member is below the first deceleration curve, but is above the second deceleration curve, and to turn the motor on when the speed of movement of the driven member is below the second deceleration curve.

6. A motor drive and control apparatus according to claim 1 in which the speed detecting means comprises an encoder such as a photo-interrupter, and in which the control means is effective to turn the motor on forcibly and wait for the rising edge of a pulse from the encoder when a time interval from the rising edge of a previous pulse to the rising edge of a current pulse from the encoder exceeds a given time interval, to turn the motor off or brake the motor in response to the rising edge of the pulse, thereby controlling of the motor in accordance with the speed of movement of the driven member.

7. A motor drive and control apparatus according to claim 1 in which the speed detecting means comprises an encoder such as a photo-interrupter delivering an output pulse, and in which the motor on limit means recognizes an operation of the motor as occurring in a limited acceleration mode when the driven member reaches to a position which is a given number of pulses short of a target position and to turn the motor off or brake the motor in response to the rising or the falling edge of the next following pulse.

8. A motor drive and control apparatus for an automatic focus adjusting unit of a camera comprising
   a motor for driving a taking lens to an in-focus position in response to an output from focus detecting means;
   speed detecting means for detecting the speed of movement of the taking lens as it is driven by the motor;
   storage means for storing an optimum deceleration curve used to stop the taking lens at a target position;
   lens control means for comparing the speed of movement of the lens against the deceleration curve to control the movement of the taking lens to the in-focus position in conformity with the deceleration curve;

and motor on limit means operative adjacent to a target position in a zone adjacent to the deceleration curve to be activated by a signal from the speed detecting means while the motor is on.

9. A motor drive and control apparatus for an automatic film winding unit comprising a drive motor for performing the film winding operation;

detecting means for detecting the speed of movement of a film;

storage means for storing an optimum deceleration curve which is used to stop the film at a position where a given length thereof has been wound up;

control means for comparing the speed of movement against the deceleration curve to control the drive motor until the stop position is reached, in conformity to the deceleration curve;

and motor on limit means operative close to a target position and in a zone adjacent to the deceleration curve to be activated by a signal from the speed detecting means while the drive motor is on.

10. A motor drive and control apparatus for camera in which a driven member is driven by a motor to move to a target position; comprising an encoder for converting a travel of the driven member into a pulse form;

detecting means for detecting that the driven member has reached within a given range short of the target position;

storage means for storing an output from the detecting means;

and motor on limit means operative subsequent to the storage in the storage means of the fact that the drive member has reached within a given range short of the target position to turn the motor on when the speed is equal to or less than a given value, and to brake or turn the motor off in response to the rising or the falling edge of a output pulse from the encoder.

11. A motor drive and control apparatus according to claim 10, further comprising calculation means for calculating the speed of the driven member on the basis of an output from the encoder, and control means for comparing the speed against a stored given deceleration curve so as to control the motor on and off in conformity with the deceleration curve.

12. A method of driving and controlling a motor for a camera in which a driven member is driven to a target position in accordance with an output from an encoder which converts a travel of the driven member into a pulse form; comprising the steps of storing the fact that the driven member assumes a position which is within a given range short of the target position and the speed is less than a given value;

driving the motor;

in the presence of the storing, turning the motor off or braking the motor in response to the rising or the falling edge of a pulse from the encoder.

13. A motor drive and control apparatus for a camera in which a driven member is driven to a target position by means of a motor; comprising an encoder for converting a travel of a driven member into a pulse form;

detecting means for detecting a speed in accordance with an output from the encoder;

control means responsive to an output from the detecting means to turn the motor off or to brake the motor;

and means for reinitiating the motor drive unless an output is delivered from the encoder within a given time interval which follows the operation of the control means.

14. A motor drive and control apparatus for a camera comprising a motor for driving a driven member;

speed detecting means for detecting the speed of movement of the driven member as it is driven by the motor;

storage means for storing a first deceleration curve which is used to stop the driven member at a target position;

comparison means for comparing the speed of movement against the first deceleration curve and also for comparing the speed of movement against a second deceleration curve which differs from the first deceleration curve;

and control means for controlling the motor between an on condition, a braked condition and an off condition on the basis of the results of the comparison.

15. A motor drive and control apparatus according to claim 14 in which the second deceleration curve is located below the first deceleration curve.

16. A motor drive and control apparatus according to claim 14 in which the control means brakes the motor when the speed of movement is above the first deceleration curve, turns the motor off when the speed of movement is above the second deceleration curve, but is below the first deceleration curve, and turns the motor on when the speed of movement is below the second deceleration curve.

17. A motor drive and control apparatus according to claim 14 in which the second deceleration curve is derived by subtracting a given value from the stored deceleration curve.

18. A motor drive and control apparatus for a movable member comprising:

a motor for driving the movable member;

movement detecting means for detecting the rate of movement achieved by said motor;

storage means for storing values defining a curve representing a deceleration form a given value to a stop condition at a predetermined target position;

control means for comparing the speed of movement provided by said speed detecting means with values stored in said storage means for controlling the operation of said motor means to thereby control the movable member sot that the movable member moves to the target position substantially in conformity with the curved stored in said memory means; and means responsive to said speed detecting means for limiting the on condition of said motor when said movable means lies in a region adjacent to the target position.

19. A method for driving and controlling a movable member which is driven to a target position by a motor whose output is monitored by an encoder for converting the output of the motor, which represents movement of the movable member, into a pulse form, comprising the steps of:

providing a predetermined curve which represents the speed of the movable member between a control position and the target position;
energizing the motor;
periodically comparing the speed of travel of the movable member against the stored values and turning off the motor whenever the speed of movement of the movable member is greater than the value against which it is compared; and
turning off the motor whenever the speed of movement of the movable member is less than the value against which the speed of the movable member is compared.

20. The method of claim 19 wherein said control operations are performed at one of two possible conditions including the rising edge and the falling edge of a pulse from the encoding means.

21. The method of claim 19 further comprising the step of braking the motor when the last pulse before the target position is detected.

22. The method of claim 19 further comprising the step of limiting the energization of the motor when the movable member is within a predetermined number of pulses greater than one from the target position.

23. The method of claim 22 wherein the number of pulses is three.

* * * * *

UNITED STATES PATENT AND TRADEMARK OFFICE
CERTIFICATE OF CORRECTION

PATENT NO. : 4,878,077
DATED : October 31, 1989
INVENTOR(S) : Maeno et al.

It is certified that error appears in the above-identified patent and that said Letters Patent is hereby corrected as shown below:

Column 3, line 57, "he" should be --the--

Column 7, line 12, after "encoder" insert --is--

Column 8, line 30, "films" should be --film--

Column 8, line 33, after "the" (first occurrence) insert --storage 13A at step #34.--

Column 11, line 42, "a" should be --an--

Column 12, line 49, "form" should be --from--

Signed and Sealed this

Third Day of September, 1991

Attest:

HARRY F. MANBECK, JR.

*Attesting Officer*   Commissioner of Patents and Trademarks